US006872268B2

(12) United States Patent
David et al.

(10) Patent No.: US 6,872,268 B2
(45) Date of Patent: Mar. 29, 2005

(54) METHOD OF CONFORMING AN ADHERENT FILM TO A SUBSTRATE BY APPLICATION OF VACUUM

(75) Inventors: John R. David, Stillwater, MN (US); Jeffrey O. Emslander, Afton, MN (US); Danny L. Fleming, Stillwater, MN (US); Michael R. Kesti, Minneapolis, MN (US); Larry A. Meixner, Woodbury, MN (US); Frank T. Sher, St. Paul, MN (US); Ronald S. Steelman, Woodbury, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 202 days.

(21) Appl. No.: 10/167,347

(22) Filed: Jun. 11, 2002

(65) Prior Publication Data

US 2003/0226637 A1 Dec. 11, 2003

(51) Int. Cl.[7] ................................................ B32B 31/04
(52) U.S. Cl. ......................... 156/71; 156/87; 156/286; 52/746.1
(58) Field of Search ............................. 428/167, 168; 156/71, 87, 94, 286; 52/746.1

(56) References Cited

U.S. PATENT DOCUMENTS

| | | | |
|---|---|---|---|
| 1,498,618 A | | 6/1924 | Fritz |
| 2,983,305 A | * | 5/1961 | Scher et al. ................ 156/247 |
| 3,900,362 A | | 8/1975 | Schaffer |
| 4,049,479 A | | 9/1977 | Siker |
| 4,166,152 A | | 8/1979 | Baker et al. |
| 4,412,876 A | | 11/1983 | Lerner et al. |
| 4,489,119 A | * | 12/1984 | Ishige et al. ................ 428/167 |
| 4,532,174 A | | 7/1985 | Freller et al. |

(Continued)

FOREIGN PATENT DOCUMENTS

| | | |
|---|---|---|
| DE | 2 160 144 | 7/1973 |
| DE | 198 42 159 | 4/1999 |
| DE | 197 33 935 | 11/1999 |
| DE | 100 45 100 | 3/2002 |
| EP | 0 570 515 | 6/1996 |
| EP | 0 617 708 | 9/1996 |
| EP | 0 787 539 | 6/1997 |
| FR | 2 300 249 | 9/1976 |
| JP | 63059517 | 3/1988 |
| JP | 01123723 | 5/1989 |
| WO | WO 92/17870 | 10/1992 |
| WO | WO 97/21206 | 6/1997 |
| WO | WO 97/31077 | 8/1997 |
| WO | WO 98/29516 | 7/1998 |
| WO | WO 00/43196 | 7/2000 |
| WO | WO 00/43220 | 7/2000 |
| WO | WO 01/89806 | 11/2001 |
| WO | WO 02/11107 | 2/2002 |

OTHER PUBLICATIONS

Satas et al, *Handbook of Pressure Sensitive Adhesive Technology*, 2$^{nd}$ Ed. (Van Nostrand Reinhold, N.Y., 1989).

(Continued)

*Primary Examiner*—Blaine Copenheaver
*Assistant Examiner*—Barbara J. Musser
(74) *Attorney, Agent, or Firm*—James D. Christoff

(57) ABSTRACT

Films are closely conformed to substrates by reducing the air pressure to a subatmospheric level in at least one airflow pathway that is present in the film or the substrate. The reduced air pressure enables the film to tightly contact the substrate in locations where protrusions or depressions on the substrate are present. The method is particularly useful for conforming film containing graphics to a variety of substrates such as the sides of semi-trailers or concrete block walls, even in instances where the semi-trailer sides include rivets and/or grooves and where the concrete block wall is relatively rough.

41 Claims, 5 Drawing Sheets

U.S. PATENT DOCUMENTS

| | | |
|---|---|---|
| 4,640,735 A | 2/1987 | Murray et al. |
| 4,670,089 A | 6/1987 | Hanson |
| 4,751,121 A | 6/1988 | Kuhnel et al. |
| 4,867,816 A | 9/1989 | Suiter |
| 4,894,060 A | 1/1990 | Nestegard |
| 4,944,514 A | 7/1990 | Suiter |
| 4,968,562 A | 11/1990 | Delgado |
| 5,106,439 A | 4/1992 | Wellings et al. |
| 5,296,277 A | 3/1994 | Wilson et al. |
| 5,425,977 A * | 6/1995 | Hopfe .................... 428/167 |
| 5,540,809 A | 7/1996 | Ida et al. |
| 5,667,165 A | 9/1997 | Gardner |
| 5,800,919 A | 9/1998 | Peacock et al. |
| 6,127,000 A | 10/2000 | Carbonell et al. |
| 6,149,749 A * | 11/2000 | McBroom .................... 156/94 |
| 6,197,397 B1 | 3/2001 | Sher et al. |
| 6,287,685 B1 | 9/2001 | Janssen et al. |
| 6,311,399 B1 | 11/2001 | Steelman et al. |
| 6,474,389 B1 | 11/2002 | Steelman et al. |
| 6,531,206 B2 * | 3/2003 | Johnston et al. ............ 428/172 |
| 2001/0031353 A1 * | 10/2001 | Hannington ................ 428/343 |
| 2002/0092611 A1 | 7/2002 | Anderson et al. |
| 2002/0146540 A1 * | 10/2002 | Johnston et al. ............ 428/167 |
| 2003/0041961 A1 * | 3/2003 | Thunhorst et al. .......... 156/247 |
| 2003/0077423 A1 * | 4/2003 | Flaningan et al. .......... 428/166 |
| 2003/0150547 A1 * | 8/2003 | Kesti et al. ................ 156/212 |

OTHER PUBLICATIONS

Wente, Van A., "Superfine Thermoplastic Fibers" in Industrial Engineering Chemistry, vol.48, pp. 1342 et seq (1956).

Report No.4364 of the Naval Research Laboratories, published May 25,1954, entitled "Manufacture of Superfine Organic Fibers" by Wente,Van A.; Boone, C.D.; and Fluharty, E.L.

Ten Steps to Successful Vinyl Truck Lettering, H. Brady, Computer–Aided Sign Making, Issue 74, Jan./Feb. 1994.

* cited by examiner

METHOD OF CONFORMING AN ADHERENT FILM TO A SUBSTRATE BY APPLICATION OF VACUUM

BACKGROUND OF THE INVENTION

1. Field of the Invention

The present invention involves materials, methods, and apparatus for adhering and conforming flexible films to substrates.

2. Description of the Related Art

Adherent films find many uses in modern commerce. For example, large graphic images used in advertising and other public displays are printed on films adhered to walls and other surfaces by means of pressure activated adhesives or other adhering means. As used herein, the term adherent films will mean films that can be adhered to a surface as a result of contact with that surface. Adherent films may comprise an adhesive surface, an electrostatic cling surface, or other adhering means that preferably involve intimate surface contact. A common type of adherent surface is one produced by a pressure activated adhesive layer. As used herein, the term pressure activated adhesive will include conventional tacky pressure sensitive adhesives as well as adhesives that may contain particulates, adhesive microspheres, microreplicated topologies, or other like adhesive systems in which adhesion is initiated by pressure applied between the adhesive and the substrate to be adhered.

Since many of the surfaces to which adherent films are to be adhered contain protrusions, depressions, and other irregularities, it is useful for such adherent films to be conformable to such surfaces. Conformability may arise from the inherent flexibility of the adherent film at room temperature, or may be produced by heating, as can be done when the adherent films are thermoplastic. It is common practice in the installation of such materials to first laminate the thermoplastic adherent film to a surface using reasonable care to produce a smooth lamination, without wrinkles, allowing tenting of the adherent film over protrusions and bridging of the adherent film over depressions. This initial lamination is then followed by selective heating of the adherent film in areas of surface irregularity, while applying pressure with resilient tools such as pads and brushes, to conform the adherent film to the surface. As used herein, the term tenting will mean the detachment of adherent film in the region surrounding a substrate protrusion which results in a tent-like draping of the adherent film over the protrusion. Similarly, the term bridging will mean the detachment of an adherent film as it is stretched over a depression in a substrate. It is common practice to pierce detached regions, for example bubbled, tented, or bridged areas, to allow release of entrapped air while pressing down on the detached region to produce conformance and adhesion. A useful tool for producing holes for the release of air is disclosed in U.S. Pat. No. 6,311,399, wherein resiliently mounted pins press against a laminated adherent film and penetrate the adherent film in areas of air entrapment, so as to provide paths for the release of entrapped air. Entrapped air in detached regions may also escape through channels within the adhesive layer. Adherent films such as 3M "Scotchcal" brand Marking film with "Comply" brand performance, commercially available from 3M Company, St. Paul, Minn., use microstructured channels, or microchannels, within the adhesive layer to allow the escape of entrapped air. Adhesive systems of this type are disclosed in co-assigned U.S. Pat. No. 6,197,397.

While various adhesive films have found wide commercial application, there remains a need for easier and faster methods of conforming such films to irregular substrates, for example riveted structures on semi-trailers and truck van bodies. Riveted structures tend to have large numbers of rivet heads requiring treatment to improve conformance, so that the speed of performing this operation becomes especially important. There is also a need for a method of conforming adherent films to irregular surfaces with less risk of damage to the surface of such films, such as might be caused by the brushes or pads commonly used to press heat-softened thermoplastic adherent films into conformance with irregular surfaces. Moreover, the current methods of conforming adherent films to irregular surfaces are often physically demanding, in that they require not only skill, but also a significant amount of physical strength and endurance. Additionally, current methods can be ergonomically demanding, in that they require simultaneous use of a heat source and several other tools, such as an air release tool for producing air release holes in the adherent film, along with a brush or pad for pressing the adherent film into contact with the surface. The task is made more difficult by the environment in which these tasks must be performed, namely standing next to the side of a semi-trailer or other large vertical surface, on a scaffold or other device providing elevation above floor level.

SUMMARY OF THE INVENTION

The present invention provides a method of conforming an adherent film to a substrate by adhering at least a portion of the adherent film to the substrate and reducing to a subatmospheric level the air pressure in the interfacial airspace between the adherent film and the substrate surface. Preferably, the film includes a thin, flexible backing that is substantially impermeable to air. As used herein, the term interfacial airspace will mean the space(s) between noncontacting portions of an adherent film and a substrate surface. Interfacial airspaces include defects such as bubbled, tented, wavy, or wrinkled film, as well as useful features such as airflow pathways created by grooves, roughness elements, and other topographies in either the adherent film surface or in the substrate. Interfacial airspaces can also result from other substrate features such as depressions, overlapping seams, and other like features found in commonly used substrates.

According to one embodiment of the present invention, a method of conforming an adherent film to a substrate comprises the acts of providing a film having an adherent layer and applying at least a portion of the adherent layer to a substrate, wherein at least one of the adherent layer and the substrate includes at least one airflow pathway. The method further includes the act of reducing the air pressure in the at least one airflow pathway to a subatmospheric pressure sufficient to remove air from one or more interfacial spaces between the adherent layer and the substrate and urge the film into conforming relation with the substrate.

In the present invention, airflow pathways serve to place interfacial airspaces in communication with at least one edge of an adherent film. Whether such airflow pathways are in the adherent layer of an adherent film or in the substrate, they will ultimately lead to at least one edge of the adherent film. As used herein, the term edge will mean either a peripheral edge of a sheet of film, or an internal edge, as might be created by slitting, piercing, or excising a portion of the film at some location away from peripheral edges. It is not necessary that any given airflow pathway be only in the adherent layer or only in the substrate. Adherent layer pathways and substrate pathways can connect to form complete airflow pathways to an edge of the film.

In preferred embodiments of the present invention, the adherent film is first partially adhered to the substrate to which it is to be conformed, after which the interfacial airflow pathways are connected to a vacuum source by an edge enclosure. Preferably, the edge enclosure encloses at least a portion of at least one edge of the adherent film in a substantially airtight manner such that the interior of the edge enclosure is in communication with airflow pathways in the interfacial airspace, while also communicating with a vacuum source, thereby placing the interfacial airspace in communication with the vacuum source. Components of edge enclosures can include sealing tapes, vacuum sealing films, spacer materials, putty, vacuum connectors and other enclosing and sealing materials.

The process of conforming the adherent film to the substrate is performed by evacuating the edge enclosure while, optionally, heating the adherent film. Some adherent films may be sufficiently flexible to be conformable at room temperature, while other adherent films, for example thermoplastic graphic marking films, may require heating during evacuation for sufficient conformance to occur. As used herein, the term evacuation and vacuum will refer to any reduction of air pressure below atmospheric, however slight, and is not limited to any particular level of vacuum.

The method of the present invention is particularly useful in situations wherein the number of protrusions, depressions, corrugations, or other mechanical features is large, since the method does not require individual conforming operations for each and every irregularity or detached region. It is an additional advantage of the present invention that adherent film materials which might not have been previously suitable for laminating to irregular surfaces can now be used for this purpose, due to the elimination of physical contact with the adherent film during the conforming process. Eliminating physical contact with the heated film during the conforming operation allows greater latitude in heating the adherent film to higher temperatures, thereby improving conformance without the risk of surface damage to films that might otherwise be fragile and easily damaged at elevated temperatures.

In another embodiment of the present invention, an adherent film is placed in close proximity to a substrate, without significant adherence, with at least a part of one edge of the adherent film being placed in communication with an edge enclosure. Edges of the film not in communication with an edge enclosure are sealed against air leakage, using, for example, pressure sensitive adhesive tape, and the edge enclosure is evacuated, thereby evacuating interfacial airspaces between the adherent film and the substrate, so as to produce intimate contact between the adherent film and the substrate. Heating the adherent film may enhance conformance of the adherent film to the substrate.

DETAILED DESCRIPTION OF THE PREFERRED EMBODIMENTS

Figure 1:
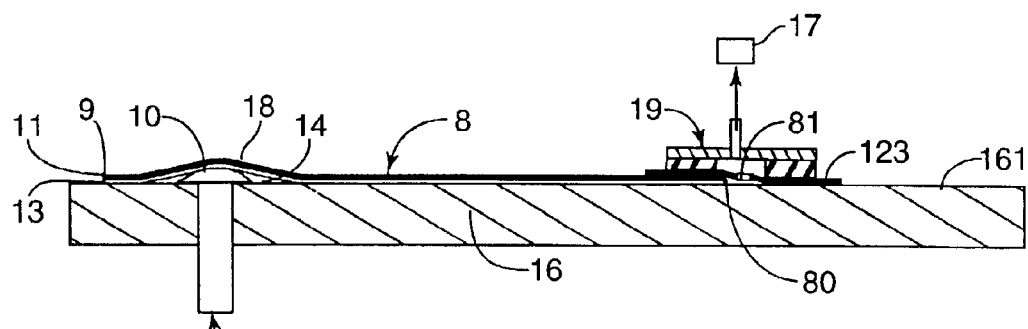
FIG. 1 is a schematic, cross-sectional view illustrating a method of conforming a film to a substrate according to one embodiment of the present invention.

In one embodiment of the present invention, portrayed in a schematic cross-sectional view in FIG. 1, adherent film 8 comprises backing 11 having adherent layer 13 attached thereto. Adherent film 8 is in turn laminated to surface 161 of substrate 16, forming a tented area over head 10 of rivet 12, so as to create detachment volume 14, defined by detached adherent film portion 18, substrate surface 161, and the surface of rivet head 10. Lamination of adherent film 8 to substrate surface 161 can be by any suitable mechanical method, such as by rolling with a compliant roller or by pressing into place by a squeegee type film applicator. Adherent layer 13 has at least one airflow pathway that allows air to flow from detachment volume 14 to edge 80 of adherent film 8. Edge 80 is covered by edge enclosure 123, which establishes an airflow passageway in communication with the airflow pathways. The edge enclosure 123 can be, for example, a length of pressure sensitive tape such as 3M brand no. 471 tape. Alternatively, edge enclosure 123 may be made of flexible adherent film, such as plasticized polyvinyl chloride film having a thickness of 0.1 mm. It has been found that this film is sufficiently conformable to form an adequate vacuum seal when vacuum is applied to the enclosed region adjacent to edge 80. Edge enclosure 123 may also be a static cling film. Sealing of enclosure 123 onto substrate surface 161, as well as to other surfaces, can be enhanced by the use of putty or other like sealing materials. Preferably, the edge enclosure does not seal any of the airflow pathways that are present at the film edge. The region enclosed by enclosure 123 is placed in communication with vacuum source 17, by creating aperture 81, and covering aperture 81 with vacuum connector 19, which is then connected to vacuum source 17. Optionally, a vacuum connector could be placed over the edge of the adherent film and used both as a vacuum connector as well as an edge enclosure.

In an alternative embodiment, film 8 is only laminated to substrate 16 at its edges, so as to seal against a substantial ingress of air, with the rest of the lamination and conformance process being performed by evacuating the interfacial airspace and heating detached areas of the film, as needed. In yet another embodiment, film 8 is not laminated to substrate 16 at all, but merely placed over it, and the edges are taped or otherwise sealed against a substantial ingress of air, after which the interfacial airspace is evacuated and heat is applied as needed.

Other airflow pathways, such as those extending from detachment volume 14 to edge 9, can be sealed by the application of sealing tape or other sealing means over edge 9, so as to isolate detached volume 14, as well as other interfacial airspaces, from ambient air. This enables vacuum source 17 to reduce the air pressure in region 14 to a subatmospheric level sufficient to produce a pressure difference across adherent film 8 and urge it into conformance with rivet head 10. It will be appreciated that absolute sealing of all possible leaks to the atmosphere in adherent layer 13 may not be necessary. For example, if the pathway from edge 9 to detachment volume 14 is long and of small cross section, compared with the path from region 14 to edge 80, then the pressure drop for any air flowing from edge 9 to region 14 may be relatively large, so that a leak might have a relatively small detrimental effect on the vacuum produced in region 14, provided the airflow rate produced by vacuum source 17 is sufficiently large. In like manner, when other leaks are present, as might be produced by a loosely fitting rivet, for example, the pressure drops occurring in the airflow pathways of adherent layer 13 can provide some isolation of such leaks, thereby enabling acceptable vacuum levels to be achieved in areas of the adhesive interface which are sufficiently far from such leaks.

In some embodiments of the present invention, interfacial airspaces having leaks can be further isolated from remaining interfacial airspaces. For example, if airflow pathways are provided in an adherent layer, some embodiments of the present invention permit the application of concentrated mechanical pressure on paths around such leaks to collapse at least some of the airflow pathways, thereby reducing the cross sectional flow area available in the airflow pathways which communicate with such leaks. This isolates, at least partially, the area surrounding the leak from other portions of the interfacial airspace. Such application of pressure might be performed by, for example, application of a mechanical device such as a narrow roller, a ballpoint pen, or other mechanical device that applies significant force over a small area to produce a high level of compressive stress. This technique is particularly useful, for example, on semi-trailers that have had holes drilled in side panels for previous mechanical attachment of signs or other attached components. It will be appreciated that the technique of collapsing airflow pathways to seal against leaks may also be used at peripheral edges of a film.

In another embodiment, leaks can be isolated by designing the airflow pathways in a zone arrangement, in which only airflow pathways in a limited area, or zone, are interconnected, and airflow pathways in each zone are isolated from airflow pathways in other zones. When zone arrangements are used, connections of vacuum sources to the adherent film should take into account the specific arrangement of zones, as would be apparent to one of ordinary skill in the art.

Figure 2:
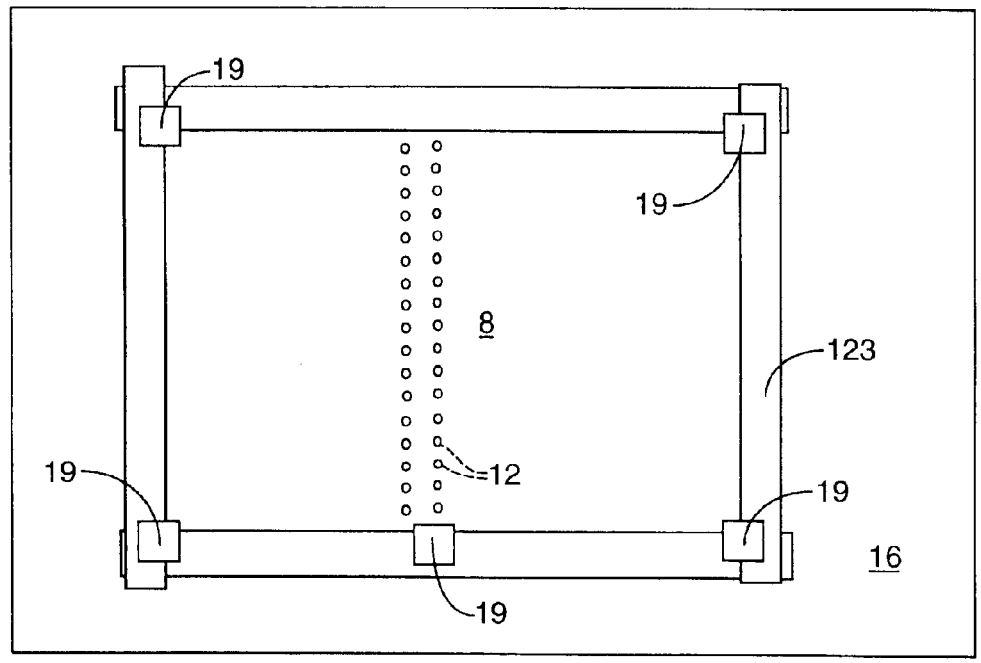
FIG. 2 is a schematic plan view of a method of conforming a film to a substrate according to another embodiment of the invention.

Depending on the size of adherent film 8, more than one aperture and vacuum connector may be needed. Referring to the example shown in FIG. 2, vacuum connectors 19 may be conveniently placed at corners of adherent film 8, or at various points along edge enclosure 123. The most effective locations for vacuum connectors will depend upon the configuration of the airflow pathways, as well as the location of any substrate surface irregularities. For example, if the airflow pathways are parallel grooves, then only a limited number of edges of adherent film 8 will be effective locations for vacuum connectors. In applications wherein protrusions or other irregularities occur in particular locations, as do rows of rivets on semi-trailers, it may be useful to locate vacuum connectors as near as possible to these locations.

Materials suitable for adherent film backing 11 include polymeric adherent films that are sufficiently flexible, either at room temperature or at elevated temperatures, to conform to protrusions or indentations in a substrate when a vacuum is applied to the interfacial airspace. The thickness of the adherent film is not particularly limited, except to the extent that thicker adherent films tend to be less flexible, and therefore less conformable to irregular substrates. Multilayer films, such as films having a protective overlaminate applied over an image layer, can also be used, provided the thickness of the combined films is not so great as to inhibit proper conformance of the film to the substrate.

Films that are conformable at room temperature include films that have softening temperatures at or below room temperature. Lower softening temperatures may be achieved, in some instances, by the use of lower molecular weight polymers. Alternatively, softening temperatures of many polymeric materials can be brought down to the desired level by the addition of solvents, plasticizers, and other monomeric materials. However, film materials, which exhibit the requisite conformability at room temperature due to low softening temperatures, may have the disadvantage of poor durability after application. It is contemplated that durability of such materials may be improved by incorporation of reactive species, along with appropriate initiators and other reactants, to enable polymerization, crosslinking, or other reactions to take place within the film after application, using energy provided by, for example, sunlight. In some cases, reactive solvents or reactive plasticizers may serve the dual function of lowering the softening temperature of the material during application, as well as serving as polymerization or crosslinking reactants after application of the film material. Where solvents provide softening of the film material, evaporation of the solvent after application of the film material to the substrate may provide a sufficient increase in softening temperature to achieve satisfactory durability.

Application of heat to the adherent film during the conforming process widens the range of possible adherent films that can be used. Commonly used thermoplastic adherent film materials, such as plasticized polyvinyl chloride, polyolefin polymers and copolymers, and a variety of polyesters, exhibit a range of temperatures above their softening points at which the method of the present invention can be used. Suitable adherent films are commercially available from 3M Company, and are commonly called adhesive marking films. Examples include 3M "Scotchcal" brand Marking film, available from 3M Company, St. Paul, Minn., and 3M "Scotchlite" brand Reflective Sheeting, also available from 3M Company.

In embodiments of the present invention wherein film materials exhibit softening points above room temperature, conformability of the film is enhanced by the application of heat during the conforming process. Types of suitable heat sources are not particularly limited, provided the selected heat source delivers sufficient heat without burning or otherwise damaging or contaminating the applied film. Suitable sources of heat include electrically powered heat guns as well as fuel combustion devices such as propane and other hydrocarbon fueled torches. Electrically powered heat guns having an air temperature sensor and an air temperature control have been found particularly useful. The specific manner in which these devices are used, in particular the time of heating and movement of the heating device over the film surface will be readily apparent to one of ordinary skill in the art.

It may not be necessary to heat every portion of the adherent film during the conforming process. It is often sufficient to heat only those areas of the adherent film that are detached from the substrate, such as tented adherent film over rivet heads. Pressure differences between ambient air and interfacial airspaces need not be great in order to produce conformance of the film to the substrate. It has been found that local pressure differences as low as about 50 mm of mercury (about 2 inches of mercury) between ambient air and an interfacial airspace can produce conformance of thermoplastic adherent film to a substrate, provided that the adherent film can be made sufficiently conformable, for example by heat softening. Depending upon the pressure drops in the airflow pathways between the portion of the adherent film being conformed and the vacuum connector, however, a considerably higher level of vacuum may be needed at the vacuum connector in order to compensate for this pressure drop and achieve the desired local pressure difference within an acceptable time period.

Figure 3:
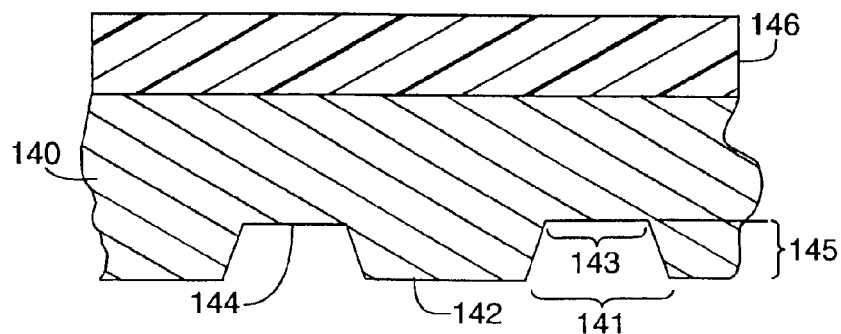
FIG. 3 is an enlarged schematic, cross-sectional view showing an exemplary film used in the method of the present invention.

In a preferred embodiment, adherent layer 13 is a pressure activated adhesive layer having airflow pathways incorporated therein. Referring to FIG. 3, an example of an adherent layer 13, designated adhesive layer 140, is provided with grooves 144. An example of a backing layer 11 is designated as back 146, which is attached to adhesive layer 140. The cross sectional shape of grooves 144 is not critical, but the trapezoidal shape portrayed in FIG. 3, having open side width 141, bottom width 143, and height 145, has been found suitable and convenient to produce. Grooves having curved cross sections have also been found useful. In use, adhesive layer 140 adheres to a substrate at surfaces 142, hereinafter referred to as lands. Per unit area of adherent film, larger land area has the advantage of providing greater adhesive contact area to adhesive layer 140, but has the disadvantage of limiting the combined cross sectional area of grooves 144, thereby restricting airflow. Reduced land area, on the other hand, allows larger cross sectional area for grooves 144, thereby increasing airflow for a given pressure gradient, but reducing the land area available for adhesive contact. The preferred groove configuration may also depend on the rheological properties of the specific adhesive being used. While the suitable depths of grooves will depend upon the thickness of adhesive layer 140, groove heights in the range of 15–45 microns and average groove widths of about 90 microns are generally useful.

In the specific case where airflow pathways are provided in the form of microstructured channels in a pressure sensitive adhesive layer, it has been found that certain types of channel configurations are preferred because relatively high airflow rates are developed under vacuum. However, the airflow rate under vacuum is not a continuously increasing function of the amount of cross-sectional area provided in the airflow channels in the adhesive. This behavior is the result of deformation of the adhesive and the backing under the force of the pressure differential between the partial vacuum in the interfacial airspace and the atmospheric pressure acting on the film surface. As a result, the dimensions of the airflow channels under vacuum may be substantially less than in the absence of a vacuum. For unfavorable configurations, the interfacial airflow pathways can be collapsed by the forces of the pressure differential.

Finite element modeling and experimental results have demonstrated that the airflow rate through the pathways under vacuum is dependent upon the configuration of the airflow pathways in accordance with the following: (1) wider airflow pathways are more effective at preserving airflow capacity under vacuum than narrow pathways even with the same initial fraction of cross-sectional area occupied by the airflow pathways; (2) when the airflow pathways are wide relative to the entire thickness of the film and the film is relatively soft, the airflow pathways can collapse under vacuum when the film sags; (3) when the airflow pathways are relatively narrow compared to the thickness of the adhesive and the contact area of the adhesive is relatively small, the airflow pathways close off under vacuum as the pressure sensitive adhesive is squeezed in a lateral direction toward the pathways; and (4) airflow through the pathways is preserved by minimizing the thickness of the adhesive layer in directions toward the backing layer. For a typical pressure sensitive adhesive coated vinyl graphic film, the initial contact area of the adhesive layer on the substrate is preferably in the range of about 40 to about 90 percent. At smaller contact areas, there may be insufficient adhesive land area to support the force of the pressure differential and the adhesive may unduly deform and reduce the area of the airflow passageways. At greater contact areas, the cross-sectional dimensions of the airflow pathways change relatively little under vacuum, but the area of the pathways is relatively small.

Preferably, the height of the airflow pathways in pressure sensitive adhesive coated films is in the range of about 15 microns to about 40 microns in directions toward the backing layer, and the cross-sectional area of the airflow pathways is preferably between 1000 and 10,000 square microns. Preferably, the width of the airflow pathways at locations next to the substrate is in the range of about 70 microns to about 250 microns, and more preferably in the range of about 100 microns to about 200 microns. In the absence of a vacuum, the area of contact between the adhesive and the substrate is in the range of about 40 percent to about 90 percent, more preferably in the range of about 50 percent to about 80 percent and most preferably in the range of about 60 percent to about 70 percent. The cross-sectional configuration of the airflow pathways can be rectangular, triangular, trapezoidal, arch shaped, or any approximation of these shapes or alternatively irregular in shape.

Grooves 144 can be arranged in a variety of patterns, including regular patterns such as rectangular grid patterns, diamond grid patterns, parallel groove patterns, and combinations thereof. An example of a combined, or hybrid, groove pattern is a pattern of parallel grooves wherein groups of two or more parallel grooves are connected by cross grooves. In some embodiments, it may also be preferred to provide one groove pattern in one area of an adherent layer and another pattern in another area, or a groove pattern that varies continuously over an area of the adherent layer. Zone type groove patterns are also contemplated. One example of a particularly useful zone arrangement is a regular groove pattern such as parallel grooves or grid patterns of grooves in which the groove pattern is periodically interrupted by an ungrooved area, which isolates each grooved area from adjacent grooved areas.

Additionally, surface topographies such as posts or spherical particles may also be incorporated into adhesive layer 140. Groove densities in the range of 6 grooves per centimeter (groove spacing of 1667 microns) have been found useful for grooves arranged in a grid pattern, while groove densities of 71 grooves per centimeter (groove spacing of 141 microns) have been found useful for grooves arranged in parallel groove patterns. Methods of incorporating groove patterns into adhesive layers are disclosed in co-assigned U.S. Pat. No. 6,197,397, incorporated herein by reference.

Pressure sensitive adhesives are particularly useful for the present invention. As defined by the Pressure Sensitive Adhesive Tape Council, a pressure sensitive adhesive is an adhesive that is capable of firm adhesion to a variety of dissimilar surfaces upon mere contact without the need of more than finger or hand pressure. Nonlimiting examples of pressure sensitive adhesives include those disclosed in U.S. Pat. No. 4,968,562 (Delgado); EPO Publication 0 570 515; EPO Publication 0 617 708; pressure sensitive adhesives disclosed in U.S. Pat. No. 5,296,277; all incorporated by reference, and the pressure sensitive adhesives disclosed in Satas et al, *Handbook of Pressure Sensitive Adhesive Technology*, $2^{nd}$ Ed. (Van Nostrand Reinhold, N.Y., 1989)

In addition to groove patterns, airflow pathways in adherent layers can also be provided by discontinuous adhesive layers, provided, for example, by the application of adhesive material in stripes, dots, or other like patterns. Airflow pathways may also be provided by use of adhesive microspheres or nonadhesive particulates incorporated into adhesive layers. Roughened adhesive layers, wherein the adhesive surface contains random bumps or other protrusions of adhesive material, can also provide airflow pathways. Bumps or other protrusions can also be added to adhesive layers by printing or otherwise depositing adhesive or nonadhesive materials onto previously formed adhesive layers or by applying an adhesive over an adhesive or nonadhesive material (which may be in the shape of dots, strings or other types of protrusions).

Airflow pathways may also be provided in the adherent layer by use of open-structured materials such as open structured adhesives and open structured adhesive sublayers. As used herein, the term open structured material will mean a material which, when placed between two surfaces, holds such surfaces apart while also providing an open path suitable for airflow between the spaced apart surfaces. Open structures can be provided by, for example, fibrous or porous adhesives. Adhesives provided in the form of blown microfibers can be used to provide an open structured adhesive layer having significant void space for airflow. Multilayer adhesive systems are also contemplated. For example, an open structured sublayer can be attached to a major surface of a film backing, with a porous or otherwise air transmissive adhesive layer attached to the sublayer. This would allow air in interfacial airspaces to flow through the adhesive layer, into the open structured sublayer, and along the sublayer to an edge of the film. Suitable materials for the sublayer include blown microfiber structures and open celled foam materials.

Airflow pathways may be permanent or temporary, though it is generally preferred that the pathways continue to remain open to airflow until lamination and conformance of the film to the substrate has been completed satisfactorily. In some embodiments of the invention, however, it is useful for the airflow pathways to be collapsible by, for example, a high level of concentrated external physical pressure, so as to enable particular areas of the interfacial airspace to be isolated by occlusion of the airflow pathways leading thereto.

Figure 4:
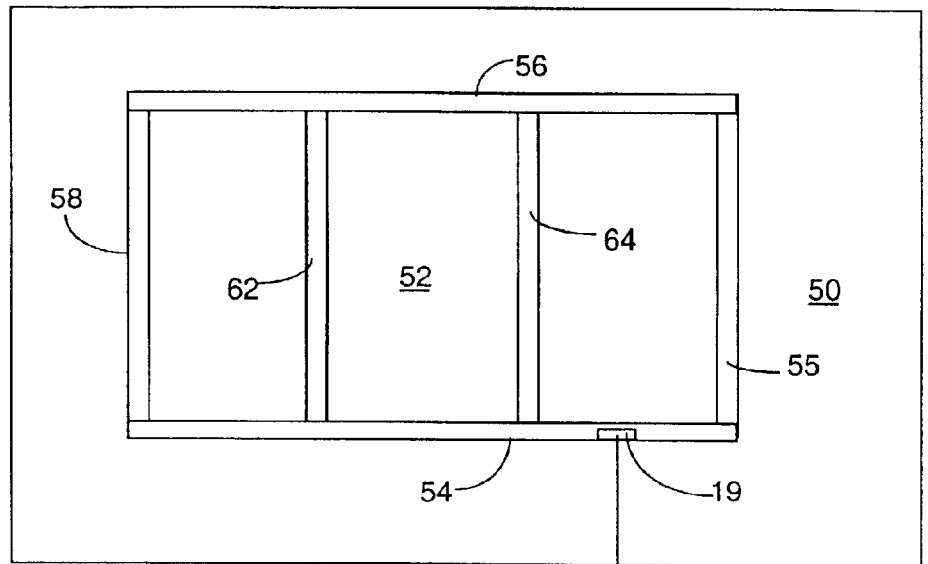
FIG. 4 is a schematic plan view of a method for conforming a film to a substrate according to yet another embodiment of the invention.

When the adherent film being applied to a substrate is of a very large size, it may be useful to provide additional airflow pathways of larger cross section in the interfacial airspace. Referring to FIG. 4, flow channels 62 and 64 have been applied to substrate 50 prior to application of adherent film 52. Channels 62 and 64 may be, for example, strips of tape attached to substrate 50 prior to applying adherent film 52 to substrate 50. It has been found that the region adjacent to tapes 62 and 64 provide effective airflow pathways, due to the slight tenting of adherent film 52 as it passes over these tapes. By providing such enhanced airflow pathways, the rate of evacuation of regions remote from the vacuum connector 19 is increased, thereby allowing the vacuum applied to vacuum connector 19 to be effective over a larger area. Additionally, reducing air flow restrictions by increasing the available flow channel cross section allows higher flow rates, thereby shortening the time needed to evacuate remote areas of the film.

It has also been found that additional airflow pathways can be provided by placing one or more long, preferably continuous, materials, for example fishing line or tape, between the adherent film and the substrate, so as to create small tented channels along the sides of the such materials. Such materials may be applied to the adherent layer prior to application of the film, or to the substrate prior to application of the film, or to both the adherent layer and the substrate.

Open structured spacer materials may also be used to create enhanced airflow pathways. Examples of open structured materials include microreplicated structures and fibrous or non-woven materials. Open structured spacers suitable for use as airflow pathways between adherent films and substrates are not particularly limited, except by the need to maintain adequate support and adhesion for the adherent film and the need to provide a suitable visual appearance of the applied adherent film, while effectively enhancing airflow.

The airflow pathways in the interfacial airspace are not limited to those found in the adherent layer. Some substrates, such as concrete blocks and other textured or rough surfaces, can also provide airflow pathways. In the case of rough or textured substrates, adherent layer 13 may not need to provide such flow paths, but could be, for example, a relatively smooth, conventional pressure sensitive adhesive layer, since the substrate itself would, in this case, provide the necessary airflow pathways. In the case of rough or textured substrates, sealing against leaks may require greater quantities of more conformable sealant to achieve adequate performance. Another substrate feature useful for providing enhanced airflow pathways is the step that occurs in overlapping panel type substrates of the type commonly used in semi-trailers. It has been found that the slight tenting of an adherent film as it passes over the step between overlapping panels creates a useful conduit for airflow.

While the edge enclosure portrayed in FIG. 1 often provides adequate cross sectional area for airflow parallel to the edge of the adherent film, it is sometimes desirable to increase the cross sectional area of the edge enclosure in order to enhance airflow. This situation can occur, for example, when larger areas of adherent film are being applied, since in such cases the distances which air must flow within the edge enclosure to reach a vacuum connector can be quite long, resulting in significant restriction in airflow. In one embodiment, the edge enclosure is increased in cross sectional area by use of spacer materials.

Figure 5:
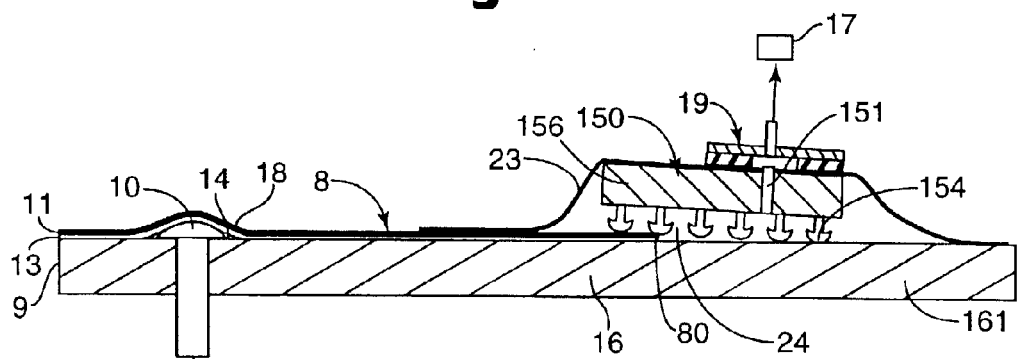
FIGS. 5–8 are views somewhat similar to FIG. 1 except showing additional methods of conforming a film to a substrate according to other embodiments of the invention.

Referring to FIG. 5, spacer material 150 is placed beneath the surface of edge enclosure 23 so as to enlarge the cross sectional area encompassed by enclosure 23. Spacer materials can be of any configuration that serves to increase the space between edge enclosure 23 and substrate surface 161, while providing an open structure that allows airflow to occur with a suitably high airflow rate. The interior of edge enclosure 23 is connected to vacuum source 17 by vacuum connector 19. As shown in FIG. 5, it may also be necessary in some instances to provide one or more apertures, such as aperture 151, in spacer material 150, to allow airflow communication between interior cavity 24 created by edge enclosure 23 and vacuum connector 19. It may also be possible, in some instances, to connect vacuum source 17 directly to spacer material 150, without the use of vacuum connector 19.

Figure 6:
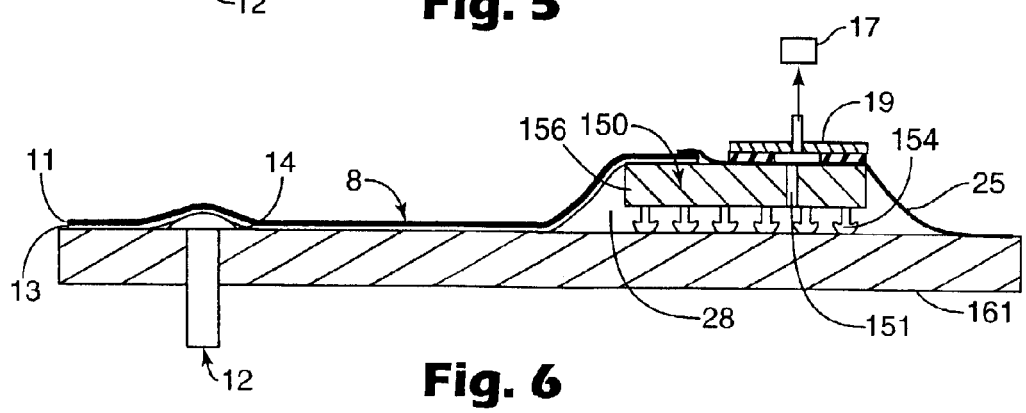

Referring to FIG. 6, spacer material 150 can also be applied beneath an edge of adherent film 8. For this embodiment it is preferred that spacer material 150 be sufficiently thin to allow it to be placed beneath the edge of adherent film 8, without causing excessive deformation of adherent film 8. Placing spacer material 150 beneath the edge of film 8 rather than over it has the advantage of avoiding surface damage to adherent film 8 which might be produced by contact with the spacer material.

In the embodiments portrayed in FIGS. 5 and 6, a suitable spacer material is a mechanical fastener array 150 made up of substrate 156 from which protrude an array of attached mushroom structures 154. Suitable commercially available materials that provide this configuration are mechanical fastener arrays such as mushroom fasteners of the type commonly referred to as reclosable fasteners. Fasteners of this type are disclosed in co-assigned U.S. Pat. No. 4,894,060. Other suitable spacer materials include sections of hook and loop reclosable fasteners.

In general, any open structure material of suitable dimensions can be used as an edge enclosure spacer. Examples of suitable edge enclosure spacer materials include fibrous structures such as woven and nonwoven fabric materials, microreplicated structures, particulate structures such as sandpaper, and other open structure materials.

Prefabricated stock materials for edge enclosures have also been created. A convenient prefabricated stock material for edge enclosures can be produced by attaching an adherent film or tape to the smooth side of a length of reclosable fastener array 150 in such a way that the attached adherent film or tape extends beyond the edges of the fastener array. The resulting stock material thus combines spacer material 150 and enclosure material 23, portrayed in FIG. 5, into a single strip of material that can be easily attached to the edge of an adherent film that has been applied to a substrate. Enclosure material 23 can be pressure sensitive adhesive tape, flexible film, flexible electrostatic cling film, or other suitably sealable material. A suitable flexible film is plasticized polyvinyl chloride film having a thickness of 0.1 mm.

Figure 7:
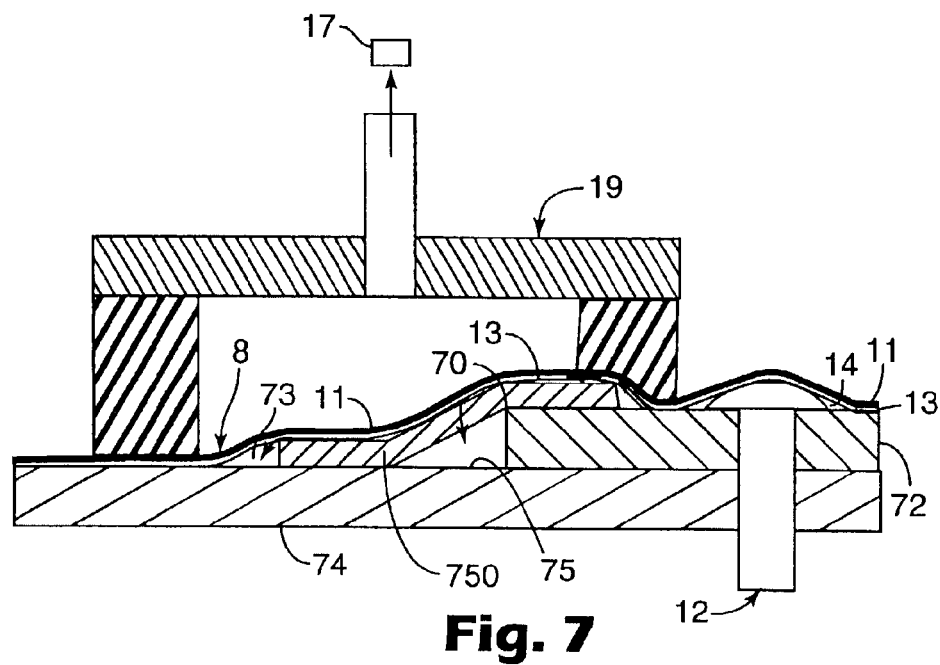

The structure of substrates to which adherent films are applied can also be used as part of an edge enclosure or as a flow channel. For example, referring to FIG. 7, panel 72 and overlapping panel 74 form part of a wall structure of the type found on semi-trailer trucks. An especially useful airflow conduit can be formed by applying spacer material 750 over panels 72 and 74 prior to applying film 8 to the structure, thereby forming conduit 75. A suitable material for spacer material 750 is a porous material such as 3M "Micropore" brand tape from 3M Company, which allows air to flow into conduit 75 in the manner indicated by the arrows. In addition, conduit 73, which is formed by the tenting of adherent film 8 over the edge of porous tape 750, can also provide an additional conduit for enhanced airflow.

Figure 8:
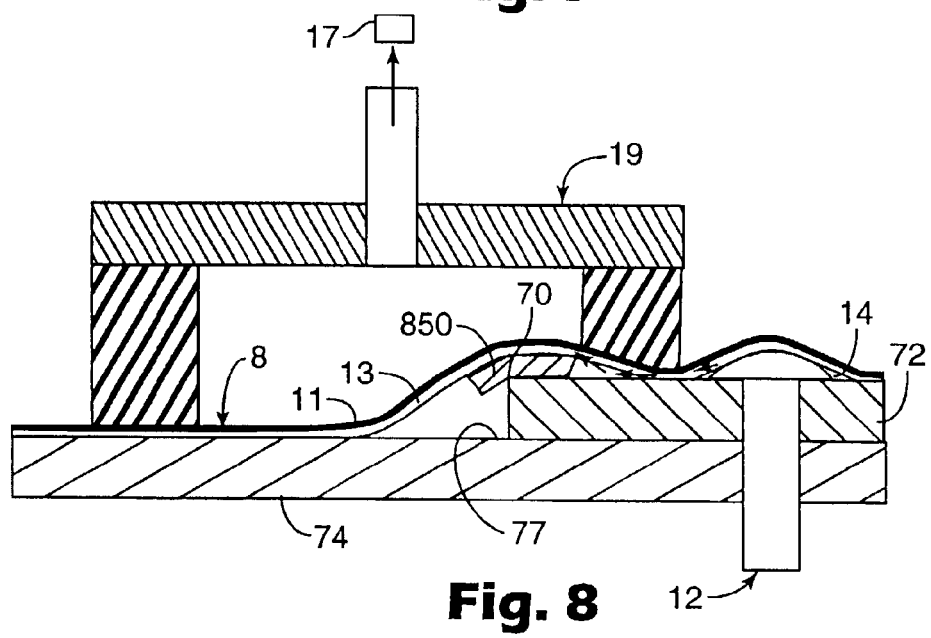

Referring to FIG. 8, cushioning material 850 can also have a beneficial effect on airflow from detachment volume 14 into conduit 77. Cushioning material 850 need not be porous or open structured to provide an airflow enhancing effect. Without wishing to be bound by any particular theory, the inventors believe that material 850 achieves its beneficial effect by preventing the occlusion of airflow pathways in adherent layer 13. Airflow pathway occlusion, as manifested by an ineffectiveness of vacuum in producing conformance, sometimes occurs when layers containing airflow pathways are pressed against sharp edges or corners of a hard material. It was also found that edge occlusion can be reduced by rounding the edges of overlapping panels with, for example, an abrasive tool. It is speculated that both cushioning material 850 and the rounding of edge 70 achieve their beneficial effect by increasing the radius over which the adherent film is bent, thereby reducing local compressive stresses on the adherent film and reducing the amount of deformation and compression of airflow pathways in adherent layer 13 so as to facilitate the flow of air in the manner indicated by the arrows in FIG. 8.

Figure 9:
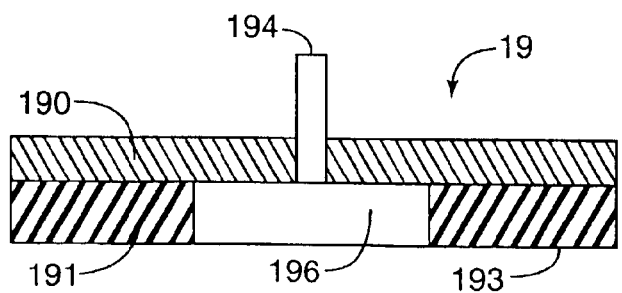
FIG. 9 is an enlarged side cross-sectional view illustrating an exemplary vacuum connector for use in the methods of the present invention.

Vacuum couplings for connecting an edge enclosure to a vacuum source can be of any suitable configuration that enables vacuum to be applied to the interior of the edge enclosure. Referring to FIG. 9, a vacuum connector 19 is made up of conformable gasket 191, which is sealed to plate 190. Tubular coupling 194 is also sealed to plate 190 and communicates with space 196. Gasket 191 can be, for example, a closed cell foam material that is able to form a vacuum seal by conforming to surface irregularities in tapes, substrates, and other surfaces associated with the edge enclosure, as portrayed in FIG. 8. Other configurations for vacuum connector 19 are also possible. For example, connector 19 may be of an elongated or other shape and size adapted to fit a particular configuration of an adherent sheet being applied. Alternative locations for vacuum connection 194 relative to plate 190 may also be provided for particular applications. In some applications, a simple rubber suction cup having an aperture and vacuum coupling provides an adequate connection between an edge enclosure and a vacuum source.

Gasket 191 can be of any conformable, substantially airtight material, such as a closed cell polymeric foam, that is of sufficient thickness and that exhibits suitable elastomeric properties. Gaskets that provide relatively little contact area for outer surface 193 are at greater risk of placing excessive pressure on the surface being contacted, which may damage, for example, the surface of the adherent film. Gasket materials that are too rigid may lack the requisite conformability.

Figure 10:
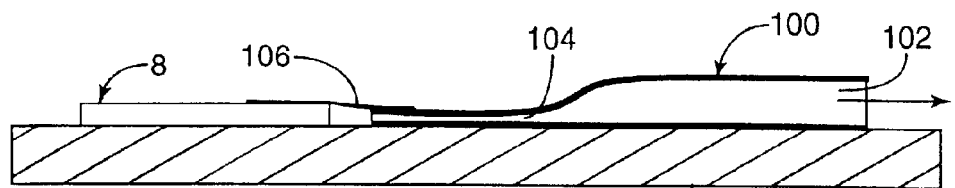
FIG. 10 is an enlarged side cross-sectional view, not necessarily to scale, of an alternative vacuum connector for use with the methods of the present invention.

Alternative vacuum connectors are also contemplated. Referring to FIG. 10, vacuum connector 100 has a tubular portion 102 and a flattened portion 104, such that flattened portion 104 fits beneath edge enclosure film 106, which can be, for example, a pressure sensitive adhesive tape or other conformable film. In a preferred embodiment, flattened portion 104 is of a material and shape suitable for film 106 to conform around it to form an acceptable vacuum seal.

Figure 11:
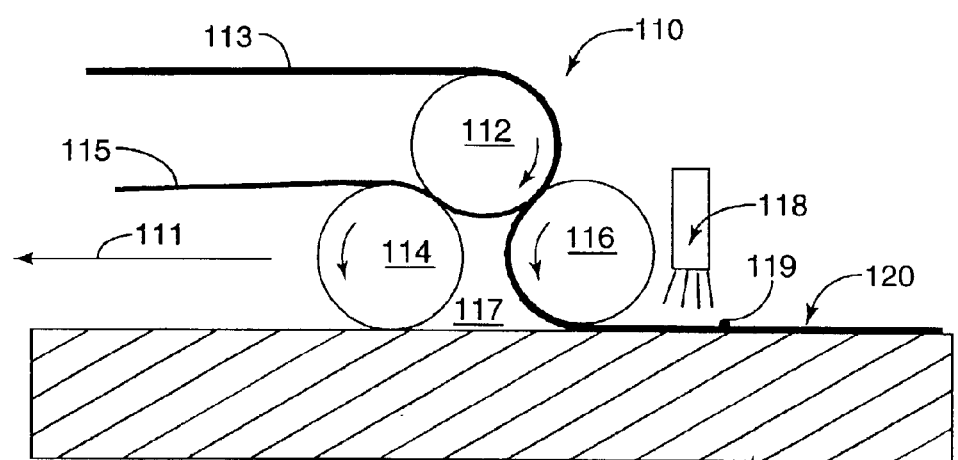
FIG. 11 is a schematic, cross-sectional view showing a movable vacuum laminator for use with the methods of the present invention.
Figure 12:
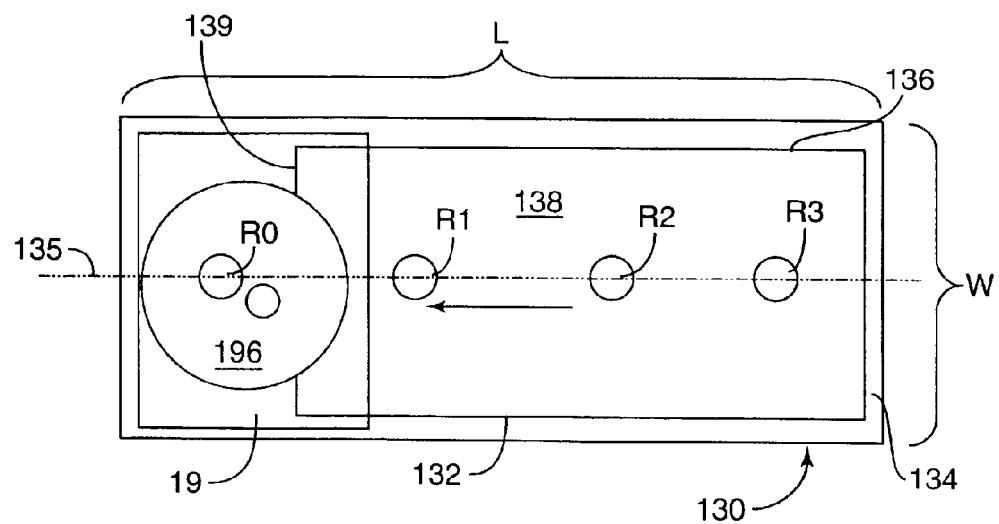
FIG. 12 is a plan view, not necessarily to scale, showing a test plate used in demonstrating the methods of the present invention.

In an alternative embodiment, the edge enclosure of the present invention need not be in a fixed location relative to the substrate or the applied film, but may, for example, move with the film relative to the substrate as the film is being applied to a substrate. An edge enclosure of this sort is disclosed in WO 00/43196 and is portrayed in FIG. 11. Referring to FIG. 11, a combined laminator and edge enclosure is made up of rolls 112, 114, and 116, which move as a unit from left to right as indicated by arrow 11 1. Adherent film 113, which initially includes a protective release liner 115 attached to adherent film 120, is supplied to roll 112. As the adherent film leaves roll 112, liner 115 is separated and removed by roll 114, where it is rolled up for disposal by an apparatus not shown. Adherent film 120 is applied to substrate 16 by laminating roll 116. Rolls 112, 114, and 116, along with end plates on each end of these rolls (not shown) form an enclosure 117 which is evacuated through a vacuum port (also not shown) located in an end plate of enclosure 117. Adherent film 120 has an adherent layer with airflow pathways that enable interfacial airspaces between film 120 and substrate 16 to be evacuated into enclosure 117. It is preferred that these airflow pathways be parallel grooves in adherent film 120, so as to allow airflow in the direction toward enclosure 117, while providing edge sealing to prevent leaks in the perpendicular direction.

Conformance of film 120 over protrusions such as rivet head 119 is enhanced by the application of heat using heat source 118, which can be, for example, a hot air blower. It is preferred that the heat source be as near as possible to laminating roll 116, since the air pressure in the interfacial airspace is lowest near enclosure 117, and heat softening adherent film 120 in the area of maximum air pressure difference between ambient and the interfacial airspace is likely to produce the maximum conformance of the film to the substrate.

Suitable vacuum sources for the present invention include vacuum pumps, vacuum aspirators, and vacuum cleaners, particularly heavy-duty vacuum cleaners of the type commonly used in woodworking and other types of workshops. When vacuum cleaners are used, removing any air filtering components from the machine enhances performance. The pressure and flow characteristics required of the vacuum source are dependent on, among other things, the particular adherent film being conformed, the amount of film heating that is done, and the speed desired of the conforming process. For example, a particular adherent film may require a local vacuum level, at a particular unbonded location, of only about 50 mm of mercury to produce adequate conformance under conditions of sufficient heating, but due to potential pressure losses in the airflow pathways of the adherent layer that may occur due to leaks, the vacuum source may have to produce a considerably higher level of vacuum at the vacuum connector in order to achieve the desired local vacuum in the desired time period. The flow rate required of the vacuum source may also be influenced by the extent to which sealing of leaks can be achieved. For example, if it is desired to conform an adherent film around a rivet that is not adequately sealed, the vacuum source may be required to provide a higher flow rate to compensate for the leakage.

EXAMPLES

Vacuum Pumps

A rotary vane vacuum pump, powered by a 1/6 horse power, electrical motor, (manufactured by Gast Mfg, a Unit of IDEX Corp, of Benton Harbor, Mich.) was used in several of the examples and is designated as "pump 1". This pump was fitted, in the following sequence, with an air filter, air bleed valve, vacuum pressure gauge, and flexible vacuum tubing. By allowing a limited amount of ambient air to enter the vacuum system, the air bleed valve was able to adjust the vacuum level as desired. A maximum vacuum level of about 630 millimeters (mm) of mercury was obtained when the air bleed valve was closed. Unless noted otherwise, the vacuum levels reported in the examples refer to that measured by the pressure gauge mounted on the pump.

A compressed air-driven vacuum pump, commercially available from PIAB (Rockland, Mass.) as part number L28A6-B2N, was also used in the examples and is designated as "pump 2". This pump was connected to a pressure regulator, air filter and compressed air line. The incoming air pressure was regulated in order to control the level of vacuum produced by the pump. A vacuum pressure gauge and flexible vacuum tubing were connected to the vacuum side of the pump.

Heating Devices

The following hand-held heating devices were used in the examples:

"Heat Gun no.1": A heavy-duty heat gun obtained from McMaster-Carr (Atlanta, Ga., catalog number 3433K21). This heat gun had adjustable air temperature controls, as well as a digital read out of the air temperature as measured near the heat gun nozzle.

"Heat Gun no. 2": An electrical heat gun commercially available as Model HG-501A from Master Appliance Corporation, Racine, Wis. The "high" and "low" settings correspond to 399 and 260 degrees C.

"Small propane torch": A "HANDI-HEET" brand soldering and heating torch obtained from Smith Equipment, Watertown, S. Dak., and fitted with a NE-182-41 fitting. This fitting provides a maximum heat output of approximately 41,000 BTUs.

Vacuum Connectors

The vacuum connectors used in the examples were made according to the following procedure. A 0.9 mm diameter hole was tapped into the center of a 10 cm×10 cm piece of 0.32 mm thick, clear, acrylic panel. A 4.5 cm diameter hole was cut into a 9.5 by 9.5 cm piece of gray, pressure sensitive adhesive backed, 1.3 cm thick, closed-cell, poly(vinyl chloride) foam (commercially available from McMaster-Carr and designated as catalog no. 86025K68). The foam was adhered to one side of the acrylic panel. A hose adapter was fitted into the hole from the other side of the acrylic panel. Flexible vacuum tubing was used to connect the vacuum connector to a vacuum source.

Measurement of Film Conformance Around Rivets

Figure 13:
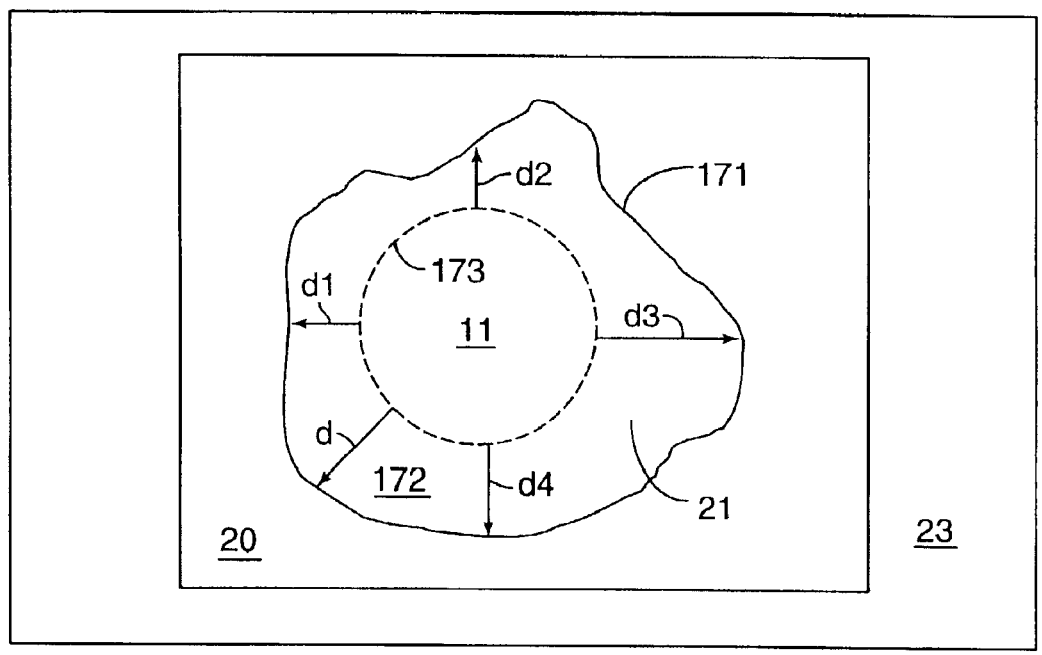
FIG. 13 is an enlarged plan view of a film applied to a substrate having a rivet, showing measurement techniques used in demonstrating the methods of the present invention.

In certain examples, film conformance was visually evaluated for degree of conformance, avoidance of air entrapment, absence of wrinkles, and damage to the film that may have occurred during the conforming process. In the case of conformance of film over surface protrusions, a useful measure of conformance is lifting distance d, which is the distance from the point of detachment from a protrusion to the point at which the detached film contacts the surface to which it is being adhered. In the case of complete conformance, with no tenting, the film is attached completely, up to the edge of the protrusion, for example the edge of a rivet head, resulting in a lifting distance of 0. Referring to FIG. 13, detached film portion 21 is portrayed as having outer detachment boundary 171, and inner detachment boundary 173, wherein film 20 is attached to surface 23 outside of boundary 171 and attached to rivet head 11 inside of boundary 173. Depending on the shape of the rivet head 11 and the angle of the detached film portion 21, the boundary 173 may be either equal in size to the perimeter of the rivet head 11 or smaller than the rivet head 11. The film portion 21 is detached in region 172, which is inside boundary 171 and outside of boundary 173. Lifting distance d is measured at several sample points, producing distances d1, d2, d3, and d4, for example. Average lifting distance D may then be reported as the average of measurements d1–d4. Since the effects of film detachment are primarily visual, the location of boundaries 171 and 173 are determined visually, and sufficiently precise measurements can usually be made with a millimeter scale. Alternatively, a typical location may be selected for taking a single measurement, d, based upon the overall visual effect of the tenting. This process, referred to as visual averaging, has been found, in many cases, to give a fair portrayal of the level of conformance to the film to the surface in the areas around rivets.

Adherent Films Used in the Examples

Graphic marking films commercially available from 3M Company as Controltac Plus brand Graphic Films with Comply brand Performance were used in the examples as shown in Table 1. The following experimental films, which were prepared using the methods described in Example 1 of U.S. Pat. No. 6,197,397 B1, were also used. Film 51C, 53C and 59C had constructions similar to the commercially available Controltac Plus brand Graphic Films with Comply brand Performance films nos. 180C and 160C except for the differences in adhesive channel pattern that are denoted in Table 1. Experimental films 4–10, 90b and 92-3b had an adhesive similar to that used in no. 3500C but have different backings.

TABLE 1

Description of Adherent Films Used in the Examples.

| Adhesive Graphic Film Name | Label | Backing (thickness) | Adhesive Airflow Channel Pattern | Pattern Density (lines per 2.54 cm) | Liner Ridge Shape (sidewall angle) | Liner Ridge Dimensions [Height/ top width/ bottom width] (microns) | Calculated theoretical PSA % Land Area |
|---|---|---|---|---|---|---|---|
| Scotchal brand Protective Overlaminate 8910 | 8910 | Clear vinyl (0.05 mm) | None | NA | NA | NA | NA |
| Controltac brand Plus Changeable Graphic Film with Comply brand Performance 3500C | 3500C | White vinyl (0.1 mm) | Grid | 20 | "U" shape (90) | 30/90/90 | 86 |

TABLE 1-continued

Description of Adherent Films Used in the Examples.

| Adhesive Graphic Film Name | Label | Backing (thickness) | Adhesive Airflow Channel Pattern | Pattern Density (lines per 2.54 cm) | Liner Ridge Shape (sidewall angle) | Liner Ridge Dimensions [Height/ top width/ bottom width] (microns) | Calculated theoretical PSA % Land Area |
|---|---|---|---|---|---|---|---|
| Controltac brand Plus Graphic Film 180-10 | 180-10 | White vinyl (0.05 mm) | None | NA | NA | NA | NA |
| Controltac brand Plus Graphic Film with Comply brand Performance 180-10C | 180-10C | White vinyl (0.05 mm) | Grid | 20 | "U" shape (90) | 30/90/90 | 86 |
| Controltac brand Plus Graphic Film with Comply brand Performance 8620C | 8620C | White vinyl (0.05 mm) | Grid | 20 | "U" shape (90) | 30/90/90 | 86 |
| Controltac brand Plus Graphic Film with Comply brand Performance 3540C | 3540C | White "Efilm" (0.1 mm) | Grid | 20 | "U" shape (90) | 30/90/90 | 86 |
| Controltac brand Plus Changeable Graphic Film with Comply brand Performance VCC8198 | VCC8198 | White vinyl (0.05 mm) | Grid | 20 | "U" shape (90) | 30/90/90 | 86 |
| Experimental film 51C | 51C | White vinyl (0.05 mm) | Parallel | 180 | Trapezoid (80) | 25/69/78 | 45 |
| Experimental film 53C and 59C | 53C, 59C | White vinyl (0.1 mm) | Parallel | 180 | Trapezoid (80) | 25/69/78 | 45 |
| Experimental film 4-10 | 4-10 | White polyester (0.12 mm) | Parallel | 180 | Trapezoid (80) | 25/69/78 | 45 |
| Experimental film 90b | 90b | Vinyl chloride/vinylacetate copolymer (0.38 mm) | Grid | 20 | "U" shape (90) | 30/90/90 | 86 |
| Experimental film 92-3B | 92-3B | Poly(caprolactone) (0.06 mm) | Grid | 20 | "U" shape (90) | 30/90/90 | 86 |

Examples 1–12 were produced by selecting various adherent films and laminating them to painted aluminum test plates having dimensions 10.2 centimeters by 30.4 centimeters, into which four test rivets had been inserted at a spacing of 7.7 centimeters, with the rivet nearest the end of the panel being at a distance of 3.5 centimeters from the panel end. The rivet spacing was chosen to place the rivets sufficiently far apart to avoid interaction between them during the laminating process. The test plates were painted with a standard white vehicle paint of the type commonly used on semi-trailers. The rivets were of a type commonly used in the fabrication of aluminum semi-trailer bodies, having a rivet head diameter of 12 millimeters, and a rivet head height of about 1.5 millimeters. The rivets were tightly pressed into the test panels so that the heads were seated firmly against the painted surface.

In each example, a 7.6 cm×24 cm piece of adherent film was applied to the test panel using a squeegee type applicator no. PA-1, available from 3M Company, taking care to avoid wrinkling, but allowing smooth tenting of film 20 to occur over rivet head 11, to form detached film portion 21. Referring to FIG. 13, a typical distance d for the tented film was in the range of 8–10 millimeters after this initial application. The adhesive film was applied such that one end of the film was within 1.3 cm from one panel end and the rivet near the opposite panel end was uncovered. Film covered rivets were designated "R1", "R2" and "R3" with the rivet closest to the vacuum connector being R1. Adhesive films with parallel airflow channels in the adhesive layer were applied such that the channels were oriented along the long length of the test panel. In most of the examples, as denoted in Table 2, portions of the adhesive film edges were covered with 3M no. 471 tape in an attempt to seal adhesive airflow channels open to the atmosphere. For adhesive films with channels arranged in an intersecting grid pattern, the film perimeter not covered by the vacuum connector was sealed. For adhesive films with parallel channels, the film edge opposite the vacuum connector was typically sealed. A ballpoint pen was pressed against the 3M 471 tape along the edge of the covered film in order to make the seal as airtight as practically possible.

A vacuum connector was connected to pump no. 1 via flexible vacuum tubing and the pump was turned on. Vacuum level was adjusted to the targeted level by sealing the vacuum connector against a smooth, flat substrate and adjusting the air bleed valve. The vacuum pump was turned off. The vacuum connector was centered over the film edge near the exposed rivet and the pump turned on in order to seal the vacuum connector against the surface. The film was observed to conform down and around the rivet. After 60 seconds, the amount of detached film d around each rivet was measured. Heat Gun no. 1, set at the targeted temperature, was then used to apply heat to the detached film around rivet R3 by holding the heat gun nozzle approximately 2.5 cm from the film surface for 2 to 10 seconds. The heat gun was removed for approximately 5 seconds and then returned to the 2.5 cm distance for an additional, similar application of heat. Duration of heating was altered from a typical length of 5 seconds at times in order to avoid film damage or evaluate longer heating times at lower temperatures. In general, decreases in heating duration had to be made at higher heat gun temperatures and/or when relatively large amounts of detached film were present in order to avoid film damage. If a significant amount of film damage inadvertently occurred, the sample was discarded and the example was repeated using a fresh piece of film and shorter heating times. The heating process was repeated for rivet R2 and then for rivet R1. The vacuum chamber was removed and the samples conditioned for 24 hours at room temperature. The amount of detached film d present around each rivet was then measured.

Comparative examples were also run using traditional application tools such as 3M rivet brush applicator RBA-3, 3M MPP-1 multipin punch (see U.S. Pat. No. 6,311,399) and 3M rivet finishing pad CMP-1, all commercially available from 3M Company. Comparative examples were prepared using the 3M multipin punch (MPP-1) in combination with either the 3M rivet brush applicator (RBA-3) or the 3M rivet finishing pad (CMP-1). First, several small holes (about 0.2 mm in diameter) were created in the detached film around the rivet by striking the film with the MPP-1. The film was then heated with Heat Gun no. 1 set at the desired air temperature for 2 seconds. Next, the appropriate finishing tool was forced against the detached film. A circular brushing motion was used with the RBA-3, whereas one downward stroke was used with CMP-1.

Results for Examples 1–12 and Comparative Examples C1–C6 are summarized in Table 2. Examples 1–6 demonstrate that 3M "Scotchcal" brand no. 3500C Marking Film laminated with 8910 overlaminate can be conformed around rivets using vacuum levels ranging from about 50 to about 500 mm of mercury. Film 3500C has a changeable adhesive and adhesive channels arranged in a grid pattern across the adhesive surface. This film and overlaminate combination was chosen for these examples because, in part, it is generally difficult to achieve good conformance without film damage for such relatively thick film backings when changeable adhesives are used, due to the stiffness of the film backings and the relatively low adhesion of such adhesives.

Example 1 shows that excellent conformance was achieved around rivet R1 after the film was heated. In contrast, no conformance was achieved around R2 and R3. Example 2 is identical to Example 1 except that the three film edges not covered by the vacuum connector were sealed with 471 tape. In this case, some conformance was achieved around R1 prior to heating, and excellent conformance was obtained for each of the rivets after heating. Thus, Example 2 shows that 471 tape was effective at reducing air ingress into the region under the detached film from the film edges through the adhesive channels. Examples 3–4 show that excellent conformance around each of the 3 rivets was obtained at a vacuum level of about 100 mm of mercury. Example 5 shows that less conformance was obtained at a vacuum level of about 50 mm of mercury. Example 6 shows that excellent conformance was also obtained at a heat gun temperature of 260 C (500 F). It is believed that there is an optimal range of temperatures for each adherent film that is dependent on a variety of factors such as film type and thickness, vacuum level, evacuation time, and the amount and volume of detached film. Suitable temperatures can be easily determined through experimentation.

Example 7 shows that good conformance prior to heat exposure was obtained when using the thinner, 180–10C, film without an overlaminate.

Example 8 shows that the adhesive channel pattern is important and can affect the degree and rate of conformance.

Example 8 evaluated film 51C, which has a similar construction to 180–10C except that the adhesive channels are arranged in a downweb, parallel pattern instead of a grid pattern. Improved conformance values, both before and after heating, were obtained for 51C relative to 180–10C. The improved conformance was possibly due to the larger number of adhesive channels per unit area for film 51C, and/or the absence of air ingress in the crossweb direction.

Examples 9–12 show that various adherent film backings can be used. Example 9 show that excellent conformance can be obtained at temperatures as low as 260C for one of 3M's adherent films, 3540C, which has a polyolefin based backing. Examples 10 and 11 show that excellent conformance can be obtained at 121 C if one uses a backing that has a suitably low softening temperature. Adherent film 4–10 had an extruded film backing comprising an 80/20/54 blend of Bostik Vitel 3300/Bostik Vitel 1070/ Clariant Renol White CTX 488 (from Bostik Finley (Middleton, Mass.) and Clariant (Muttenz, Switzerland)), an adhesive similar to that used for 3500C, and parallel adhesive channels. Adherent film 92-3B had a similar construction as 180C-10 except that it had a backing comprised of a film of poly(caprolactone), which was cast from solvent onto smooth release liner. Example 12 shows that excellent conformance can be obtained with films as thick as 0.38 mm. Film 90B was of similar construction to 180C-10 except that the backing was comprised of a vinyl chloride/vinyl acetate copolymer similar to OxyChem 1810 (from Occidental Chemical Corporation, Dallas, Tex.).

Comparative Example C-1 shows that no conformance was achieved when 51C film was applied such that the adhesive channels were oriented perpendicular to the length of the panel. No conformance was achieved since the vacuum connector was placed over a film edge that did not have exposed adhesive channels.

Comparative Example C-2 shows that no conformance was obtained when an adherent film that had no adhesive channels or sufficient discontinuities was used.

Comparative Examples C3-C6 demonstrate that traditional rivet finishing tools, such as the 3M RBA-3 rivet brush and the 3M CMP-1 finishing pad, provide poorer overall results due to film damage and/or poorer conformance.

TABLE 2

| Example | Adhesive Film Label | Adhesive Airflow Channel Pattern | Edges sealed with 471 Tape? | Approx. Vaccum Level, mm of mercury | Heat Gun Setting (° C.) | Duration of $1^{st}$ and $2^{nd}$ Heating Steps (sec) R1 | R2 | R3 | Detached Film Distance, d, mm (rivet R1/R2/R3) Prior to Heating | After Heating and aging 24 hours at room temperature |
|---|---|---|---|---|---|---|---|---|---|---|
| 1 | 3500C/8910 | grid | no | 500 | 538 | 3/5 | 3/5 | 3/5 | 10/10/10 | 1.5/10/10 |
| 2 | 3500C/8910 | grid | yes | 500 | 538 | 5/5 | 3/5 | 3/5 | 6/8/10 | 0.5/0.5/1.5 |
| 3 | 3500C/8910 | grid | yes | 300 | 538 | 5/5 | 5/5 | 5/5 | 6/6/6 | 0.5/0.5/1 |
| 4 | 3500C/8910 | grid | yes | 100 | 538 | 5/5 | 3/5 | 3/5 | 7/8/8 | 0/1/1.5 |
| 5 | 3500C/8910 | grid | yes | 50 | 538 | 3/3 | 3/3 | 3/3 | 8/10/10 | 2/5/10 |
| 6 | 3500C/8910 | grid | yes | 200 | 260 | 10/0 | 10/0 | 10/0 | 6/6/8 | 1.5/1.5/2.5 |
| 7 | 180C-10 | grid | yes | 300 | 538 | 5/5 | 5/5 | 2/2 | 4/5/5 | 0.5/0.5/4 |
| 8 | 51C | parallel | yes | 300 | 538 | 5/5 | 5/5 | 5/5 | 3/3/3 | 0/0/0 |
| 9 | 3540C | grid | yes | 200 | 260 | 10/0 | 10/0 | 10/0 | 6/8/8 | 0.5/0.5/0.5 |
| 10 | 4-10 | parallel | yes | 200 | 121 | 5/5 | 5/5 | 5/5 | 2/2/3 | 0.5/0.5/1 |
| 11 | 92-3B | grid | yes | 200 | 121 | 10/0 | 10/0 | 10/0 | 4/4/5 | 3/1/1 |
| 12 | 90b | grid | yes | 200 | 538 | 5/5 | 5/5 | 5/5 | 19/18/17 | 0.5/1/1 |

TABLE 2-continued

| | | | | | | | | | Detached Film Distance, d, mm (rivet R1/R2/R3) | |
|---|---|---|---|---|---|---|---|---|---|---|
| Example Label | Adhesive Film | Adhesive Airflow Channel Pattern | Edges sealed with 471 Tape? | Approx. Vacuum Level, mm of mercury | Heat Gun Setting (° C.) | Duration of 1st and 2nd Heating Steps (sec) | | | Prior to Heating | After Heating and aging 24 hours at room temperature |
| | | | | | | R1 | R2 | R3 | | |
| C-1 | 51C applied Crossweb | perpendicular | yes | 300 | 538 | 2/2 | 2/2 | 2/2 | 8/8/8 | No change[a] |
| C2 | 180-10 | None | yes | 200 | 538 | 2/2 | 2/2 | 2/2 | 10/10/10 | No change[a] |
| C3 | 3500C/8910 | grid | no | CMP-1 | 538 | 2/0 | 2/0 | 2/0 | 8/8/8 | 2.5/1/1[c] |
| C4 | 3500C/8910 | grid | no | brush | 538 | 2/0 | 2/0 | 2/0 | 8/8/8 | difficult to measure[d] |
| C5 | 3500C/8910 | grid | no | brush | 260 | 2/0 | 2/0 | 2/0 | 8/8/8 | 2/2/1[d] |
| C6 | 3500C/8910 | grid | no | brush | 121 | 2/0 | 2/0 | 2/0 | 8/8/8 | 3/3/3[e] |

[a]upon heating, the entrapped air under the detached film expanded with caused the detached region to expand (like a balloon).
[b]large wrinkles around R3, surface impression from CMP-1 foam pad around R2 and R3.
[c]surface impressions from CMP-1 foam pad around each rivet
[d]severe film damage and wrinkles around each rivet
[e]large film wrinkles around each rivet

Example 13

This example shows that (a) a discontinuous coating of a pressure sensitive adhesive comprised of adhesive microspheres can be used to provide airflow channels between a backing and a substrate, and (b) cellulose acetate films can be conformed around small features such as the markings in a United States dime. A dime was placed onto a glass panel and then covered with a 1.9 cm wide by 8 cm strip of 3M brand 811 Office Tape. The 811 tape had a backing comprising cellulose acetate film and an adhesive layer which comprises a discontinuous coating of a blend of adhesive microspheres and a latex pressure sensitive adhesive. The microsphere adhesive was similar to those described in U.S. Pat. No. 4,166,152. Three edges of the 811 tape were sealed to the .glass panel with 3M brand 471 tape. A vacuum connector was placed over the unsealed 811 tape edge and a vacuum level of about 300 mm of mercury was obtained. Detached film around and over the dime was heated with Heat Gun no.1 set at 538 C until the detached film conformed tightly around the dime and no detached film remained. After the dime had cooled, the 811 tape was removed and inspected. The tape removed cleanly and the surface features of the dime had been imparted into the 811 tape with a very high fidelity.

Comparative Example C7

Example 13 was repeated except that 3M brand 810 tape was used. This tape had a similar construction as 811 tape except that the adhesive was a relatively smooth coating of a latex pressure sensitive adhesive. No conformance was observed.

Example 14

This example shows that a porous adhesive comprised of a coherent nonwoven web of fibers can be used to provide sufficient airflow pathways between the backing and the substrate. A pressure sensitive adhesive comprising a 92/4/4 terpolymer of isooctyl acrylate, acrylic acid and styrene was tackified with 23 wt % of Escorez 2393 tackifier (from Exxon Chemical Company). The mixture was blended with Exact 4023 polyethylene (from Exxon Chemical Company) in a Twin Screw extruder manufactured by Brabender Corporation, and fed to a drilled orifice, melt blown die. The die had 15 holes per 2.5 cm (inch) and was maintained at a temperature of 190 C. The adhesive feeder was maintained at 190 C while the polyethylene was fed in pellet form into the extruder at a rate sufficient to maintain a 20 wt % loading. A tacky, melt blown web with a basis weight of 75 grams per square meter was prepared using a melt blowing process similar to that described in Wente, Van A., "Superfine Thermoplastic Fibers" in Industrial Engineering Chemistry, Vol.48, pages 1342 et seq (1956) or in Report No.4364 of the Naval Research Laboratories, published May 25, 1954, entitled "Manufacture of Superfine Organic Fibers" by Wente, Van A.; Boone, C. D.; and Fluharty, E. L., except that the apparatus utilized a twin screw extruder which fed its melt stream to a gear pump that controlled the polymer melt flow. The gear pump fed a feedblock assembly that was connected to a melt-blowing die having circular smooth surface orifices with a 5:1 length to diameter ratio. Both the die and the feedblock assembly were maintained at 190 C and the die was operated at a rate of 178 g/hr/cm die width. The web was collected on release liner using a collector distance of about 17.5 cm. The fibrous adhesive was then laminated to a 100 micron (4 mil) thick extruded vinyl film and trimmed to a final size of 15 cm×25 cm. The release liner was removed and the adhesive coated film was applied to a 30 cm×30 cm flat metal test panel such that small, bump and wrinkle-like regions remained unbonded. Strips of 2.5 cm wide 3M 471 tape were applied around the perimeter of the film with the exception of a 1 cm area that was left uncovered. A vacuum connector was placed over the exposed film edge and vacuum applied. The film was drawn tightly to the metal panel, eliminating the bumps and wrinkles. Heat Gun no.1 set at 370 C was used to heat the film surface. Upon cooling of the film and release of the vacuum the adhesive coated vinyl film remained in intimate contact with the metal test panel.

Examples 15–19 demonstrate that the inventive methods that can be used to efficiently conform detached regions that are distributed across very large pieces of adherent film. In these examples, large pieces of adherent film were applied to a white, 16.2 meter long by 2.5 meter high (53' by 8') semi-trailer manufactured by Trailmobile Trailer Corporation. The trailer exterior consisted of flat, painted, vertical, 1.2 meter by 2.5 meter (4' by 8'), 1 mm thick, aluminum panels that were riveted to each other at overlapping truck panel seams, as well as, to internal, vertical support beams. Rivets were arranged in vertical rows that were generally located at the following distances from the upper, overlapping truck panel edge: 1.3, 10.2, 61 and 71 cm (0.5, 4, 24 and 28"). Rivets were spaced 10.2 cm (4") apart in the vertical direction except for those that were 1.3 cm (0.5") from the panel edge; these were 5 cm apart. The rivet heads were dome-shaped, 12 mm in diameter, 1.5 mm high and had flat tops where the diameter of the flattened top area was 6 mm.

Example 15

This example shows that a large piece of adherent film, covering approximately half the side of a semi-trailer, can be efficiently "finished" by placing suitable edge enclosures around the entire film perimeter and applying vacuum. Two 1.2 meter (4')× 7.6 meter (25') pieces of 3M VCC8198 film were imaged using a "Scotchprint" brand 2000 printer, laminated with 8910 protective overlaminate, and then applied to a side of the semi-trailer using a 3M "Scotchprint" brand Graphic Applicator (SGA). The first piece of film was applied to the bottom half of the trailer; the second piece overlapped the top edge of the first piece by approximately 3 cm. The SGA is a vacuum laminator, which is commercially available for lease from 3M Company and is disclosed in WO 01/89806 A1 and WO 00/432196. Film and liner were routed through the vacuum laminator in a similar manner as shown in FIG. 11. The SGA applied adherent film such that the amount of detached film around each rivet was typically 8–10 mm. Edge enclosures comprised of spacer material covered by 471 tape were mounted over the entire film perimeter. Three different materials were used as the spacer material: (a) 14.5 meters of 2.5 cm wide strips of "Scotchmate" brand Thin Hook and Loop Reclosable Fastener (product number XMH-00-190, from 3M Company), which had approximately 90, 0.5 mm high hooks per square centimeter; (b) 3 meters of 5 cm wide strips of "Dual Lock" brand reclosable fastener (product number SJ-3441, from 3M Company) which had 400, 2 mm high stems per 6.45 square cm (square inch), and (c) 3 meters of 2.54 cm wide strips of "Dual Lock" brand fastener (product number SJ-3442, from 3M Company) which had 170, 2 mm high stems per 6.45 square cm (square inch). Holes, approximately 1 square centimeter in size, were cut into the edge enclosures at two locations: one along the top film edge, and one along the bottom film edge. Two vacuum connectors were attached to pump no. 2 and placed over the holes and interfacial airspace between the adherent film and the truck surface was evacuated. A vacuum level of about 430 mm of mercury was obtained. The detached film around the rivets across the entire adherent film surface was observed to decrease to a distance d of about 6–8 mm. Areas of detached film were then heated with either a small propane torch or Heat Gun no. 1 set at 593 C. Upon heating, the detached film conformed tightly around the rivets to d values of 0 to 2 mm. The finishing rate was slightly lower near the center of the trailer where the two pieces of adherent film overlapped. It is speculated that exposed adhesive airflow channels at the overlap contributed to the lower finishing rate in that area. The next day, the film was inspected and measured d values ranged from 0–3 mm.

Example 16

This example shows that various heating devices can be used to heat detached film and vacuum need only be applied along the bottom film edge if appropriate airflow pathways are provided. VCC8198 film was applied to the trailer side in a similar manner as in Example 15. Prior to film application, 1.3 cm by 2.4 meter strips of "Micropore" brand Paper First Aid Tape strips (from 3M Company) were placed over the vertical truck panel seams such that the strips bridged the upper and lower panels. An edge enclosure comprised of 3M 471 tape and "Dual Lock" brand fastener (product number SJ-3441, from 3M Company) was applied over the bottom edge of the film. The rest of the film perimeter, as well as the overlap between the two pieces of film were sealed with 3M 471 tape. A vacuum connector was connected to Pump no. 2 and placed over a hole in the edge enclosure. The pump was activated. Small leaks at the truck panel seams were sealed with Plumber's putty as needed. A vacuum level of about 250 mm of mercury was obtained. The top piece of adherent film was then heated with a 30 cm wide, propane ribbon burner, commercially available from Flynn Burner Corporation (New Rochelle, N.Y.), which was mounted to an order picker platform. The order picker was driven along the side of the trailer at an approximate rate of 15 cm per second. Three down and back passes were made at three different elevations in order to canvas the entire top piece of film and heat each area twice. One down and back pass was made with a flame length of 2.5 cm and the burner 15 to 20 cm from the trailer surface. Two down and back passes were made with a flame length and burner-to-truck distance of 7.5 cm. The burner delivered approximately 8,000 BTU per 2.54 cm. Sections of the bottom piece of adherent film were then heated with varying hand-held heating devices. The amount of detached film as well as the number of riveted areas that were heated with each heating device were measured the following day. Results shown in the following table indicate that good conformance was obtained with each of the heating devices.

| Heating Device | Number of Rivet Areas heated | Average Detached Film d, mm |
| --- | --- | --- |
| Ribbon Burner, 15–20 cm from trailer | 84 | 4.4 |
| Ribbon Burner, 7.5 cm from trailer | 196 | 0.6 |
| Small propane torch, "low" flame | 72 | 0.1 |
| Small propane torch, "high" flame | 48 | 0.5 |
| Heat Gun no. 1 set at 427 C. | 41 | 0.9 |
| Heat Gun no. 1 set at 566 C. | 71 | 0.8 |
| Heat Gun no. 2 set on "high" | 43 | 3.3 |
| Heat Gun no. 2 set on "low" | 61 | 1.5 |

Example 17

This example shows that the detached regions across a large piece of adherent film that has downweb, parallel grooves in the adhesive layer can be efficiently conformed using the methods of this invention by utilizing the truck panel seams as crossweb, high airflow channels. Strips of 1.3 cm wide "Micropore" brand Paper First Aid Tape (from 3M Company) were bridged over six, adjacent truck panel seams. Two, 1.2 meter by 7.6 meter pieces of film 59C, which had been laminated with 8910 protective overlaminate, were applied to the trailer and over the tape strips using the SGA in a similar manner as in Example 15. The vertical film edges were sealed with 3M 483 Tape. Gaps along the top film edge at the truck panel seams were sealed with Plumber's Putty. Three vacuum connectors were connected to a common manifold, which was subsequently connected to pump no. 2. An additional set of three vacuum connectors, common manifold and a pump no. 2 was assembled. Both pumps were activated and the six vacuum connectors were placed along the bottom film edge at the six different truck panel seams. The detached film around each of the rivets was observed to conform around the rivets. The detached regions were heated with a small propane torch set on "low". Vacuum level was varied between about 130 and about 380 mm of mercury. The vacuum connectors were removed and the amount of detached film d around each rivet was measured the following day. The average d value was determined to be less than 1.5 mm.

Example 18

This example shows that film application and detached film conformance can be integrated into a single step by applying adherent film with a vacuum laminator similar to that described in WO 00/43196 and WO 01/89806 A1, and applying heat immediately after lamination. The "Scotchprint" brand Graphic Applicator (SGA) was used to apply several meters of 8620C film to the side of a semi-trailer in a similar manner as in Example 15. Heat was applied immediately after film application by manually holding Heat Gun no. 1 and/or the "small propane torch" just behind the SGA and over the detached film around the rivets. The detached film was observed to conform around the rivets as the film was exposed to heat. Conformance occurred because the vacuum laminator evacuated the airflow channels within the adhesive layer at the film application front. The SGA application rate was reduced and/or stopped immediately after applying the film over some of the vertical rows of rivets in order to provide time to canvass all of the rivets with the hand-held heating devices, as well as to provide additional time for evacuating the air space underneath the detached film. The amount of detached film around each of the rivets that was heated was significantly reduced and some areas had d values below 1 mm. Such an integrated process can be optimized to obtain a system that applies adherent film in a very rapid manner with minimal amounts of detached film. Such improvements would include the design of larger adhesive channels, an optimized SGA application rate, and an optimized heat source and location.

Example 19

This example shows that adherent film covering the entire side of a semi-trailer can be efficiently "finished". Two 1.2 meter (4')×15.2 meter (50') pieces of 3M 8620C film were imaged using a "Scotchprint" brand 2000 printer, laminated with 8910 protective overlaminate, and then applied to a side of the semi-trailer using a "Scotchprint" brand Graphic Applicator (SGA) in a similar manner as in Example 15. An edge enclosure comprised of "Scotchmate" brand Thin Hook and Loop Reclosable Fastener (product number XMH-00-190, from 3M Company) covered by 3M 483 tape was mounted over the entire film perimeter. The overlap between the two pieces of film was sealed with 3M 483 tape. Openings were cut into the edge enclosure along the bottom of the film edge at each of the 13 truck panel seams. Vacuum connectors were placed over the edge enclosure openings. The 13 vacuum connectors were connected to three different manifolds and three pumps (each was a pump no. 2) in sets of 5, 5 and 3. Small leaks along the top edge enclosure at the truck panel seams were sealed with Plumber's Putty. A vacuum level of approximately 300 mm of mercury was obtained. The film was observed to conform around each of the rivets to d values of 4–6 mm. Heat was applied to the detached film around each rivet and over the truck panel seams with the small propane torch. Upon heating, the film conformed around the rivets. D values were less than 1 mm.

Examples 20–22 show that these methods can be used to conform adherent film to rough surfaces such as painted cement block walls and painted sheet rock.

Example 20

A 0.8 meter by 1.2 meter piece of 5° C. film was applied to a painted, concrete block wall by hand. Since the block wall surface was very rough, relatively little contact was actually made between the pressure sensitive adhesive and the surface. The majority of the film bridged the various surface depressions. Edge enclosures comprised of 2.5 cm by 1.2 meter strips of "Dual Lock" brand fastener (product number SJ-3441, from 3M Company) and 3M 471 Tape were placed over two of the film edges and adhered to the film and the wall surface. The other two edges of the film were sealed with 3M 471 Tape. Heat Gun no. 1 was used to heat the 3M 471 Tape which was attached to the wall. While the tape was hot, a compliant rubber roller was pressed against the tape in order to conform the tape to the wall surface and improve the seal. Vacuum connectors were connected to pump no. 2 and placed over small openings in edge enclosures. Vacuum levels ranging from about 250 to about 380 mm of mercury were obtained. The vacuum urged the film against the surface. Heat Gun no. 1 set at 538 C was then used to heat the film. As each area was heated, the film conformed tightly into the surface depressions. After heating, very little detached film remained and the covered wall had an appealing, paint-like appearance. The sample was inspected after one month of aging. Minimal lifting of the film from the surface had occurred. A small piece was easily removed by hand, demonstrating easy removal.

Example 21

Example 20 was repeated except that film 180-10 was used. Similar results were obtained as in Example 20. This example demonstrates that channels in the adhesive are not required if the surface topography provides adequate airflow pathways between the adherent film and surface.

Example 22

This example shows that these methods can be used to conform adherent films into relatively deep cavities such as those on corrugated truck panels. A 60 cm by 60 cm, painted, corrugated truck panel was obtained. The panel had protruding corrugations (ridges) that ran across the length of the panel. Each ridge was 1.8 cm wide and 5 mm high. Ridges were spaced 4 cm apart. Rivets were present in the valleys between the ridges. A piece of 53C film was applied to the panel such that the film only contacted the ridge tops and the parallel channels in the adhesive layer were oriented perpendicular to the direction of the ridges. The film edges were manually pressed into the valleys and adhered to the panel; 3M 471 tape was used as needed in order to seal the film edges. An edge enclosure comprised of 471 tape and XMH-00-190 was placed over one edge of the 53C film. A vacuum connector was placed over an opening in the edge enclosure and a vacuum level of about 250 mm of mercury was obtained. Heat Gun no. 1 set at 316 C was used to gently heat the detached film. The film conformed into the valleys and around the rivets.

What is claimed is:

1. A method of conforming an adherent film to a substrate comprising:

providing a film having a backing and an adherent layer, wherein the adherent layer comprises a pressure sensitive adhesive;

applying at least a portion of the adherent layer to a substrate, wherein the film includes at least one airflow pathway presenting an unobstructed channel extending in directions along the backing between the backing and the substrate; and reducing the air pressure in the at least one airflow pathway to a subatmospheric pressure sufficient to remove air from one or more interfacial spaces between the film and the substrate and urge the film into conforming relation with the substrate.

2. The method of claim 1 further comprising the act of heating at least a portion of the film while the air pressure in the space is at a subatmospheric level.

3. The method of claim 1 further comprising the act of providing an edge enclosure on at least one edge of the film.

4. The method of claim 3 wherein the act of reducing the air pressure is carried out by moving air through an aperture of the edge enclosure.

5. The method of claim 1 further comprising the act of sealing at least one edge of the film against airflow.

6. The method of claim 1 wherein the film further comprises a backing connected to the adherent layer.

7. The method of claim 6 wherein the backing comprises a thermoplastic material.

8. The method of claim 6 wherein the backing is chosen from the group consisting of polyvinyl chloride, polyolefin polymers and copolymers, polyester polymers and copolymers, and polyurethane polymers and copolymers.

9. The method of claim 6 wherein the backing is conformable at room temperature.

10. The method of claim 1 wherein the adherent layer comprises at least one groove.

11. The method of claim 1 wherein the adherent layer comprises a plurality of grooves and wherein at least one of the grooves crosses another groove.

12. The method of claim 1 wherein the adherent layer comprises a plurality of substantially parallel grooves.

13. The method of claim 1 wherein the film further comprises a backing and an open structured sublayer attached to a major surface of the backing, and wherein the adherent layer comprises an airflow transmissive adherent layer attached to the sublayer.

14. The method of claim 1 wherein the adherent layer comprises adhesive microspheres.

15. The method of claim 1 wherein the adherent layer comprises blown adhesive microfibers.

16. The method of claim 1 wherein the adherent layer exhibits electrostatic cling.

17. The method of claim 1 wherein the substrate comprises at least one surface having rivet heads, overlapping panels, corrugations, or indentations.

18. The method of claim 1 wherein the substrate comprises at least one airflow pathway.

19. The method of claim 1 wherein the substrate comprises concrete.

20. The method of claim 1 wherein the substrate comprises at least one surface irregularity that produces an airflow conduit in airflow communication with at least one edge of the film.

21. The method of claim 20 wherein the substrate includes pressure sensitive adhesive tape, spacer material, or string.

22. The method of claim 1 and including the act of providing at least one edge enclosure along at least one edge of the film, wherein the edge enclosure comprises a material chosen from the group consisting of pressure sensitive adhesive tape, flexible polymeric film, and static cling film.

23. The method of claim 1 and including the act of providing at least one edge enclosure along at least one edge of the film, wherein the enclosure comprises a spacer material.

24. The method of claim 23 wherein the spacer material is chosen from the group consisting of reclosable fastener arrays, microstructured materials, porous materials, nonwoven fabrics, woven fabrics, and blown microfiber materials.

25. The method of claim 1 wherein the at least one airflow pathway has a height in the range of about 15 microns to about 40 microns.

26. The method of claim 1 wherein the at least one airflow pathway has a width in the range of about 70 microns to about 250 microns.

27. The method of claim 1 wherein the at least one airflow pathway has a cross-sectional area in the range of about 1000 square microns to about 10,000 square microns.

28. The method of claim 1 wherein the act of applying at least a portion of the adherent layer to a substrate includes the act of contacting the adherent layer to the substrate across an area that is approximately 40 percent to approximately 90 percent of the overall area of the film.

29. The method of claim 1 wherein the act of applying at least a portion of the adherent layer to a substrate is carried out using a roll type vacuum laminator having a laminating roll and a prelamination vacuum chamber.

30. A method of applying a conformable adherent layer to a substrate, comprising the steps of:
   a) providing a conformable film comprising an adherent layer and at least one airflow pathway presenting an unobstructed channel, and wherein the adherent layer comprises a pressure sensitive adhesive;
   b) providing a substrate;
   c) placing the adherent layer in contact with the substrate using a roll type vacuum laminator having a laminating roll and a prelamination vacuum chamber in communication with the at least one airflow pathway;
   d) heat softening a laminated portion of the film in an area proximate to the laminating roll.

31. The method of claim 30 wherein the at least one airflow pathway comprises a plurality of parallel grooves extending toward the vacuum chamber while providing edge sealing to prevent leaks in a perpendicular direction.

32. The method of claim 30 wherein the film further comprises a backing connected to the adherent layer.

33. The method of claim 32 wherein the backing comprises a thermoplastic material.

34. The method of claim 32 wherein the backing is chosen from the group consisting of polyvinyl chloride, polyolefin polymers and copolymers, polyester polymers and copolymers, and polyurethane polymers and copolymers.

35. The method of claim 30 wherein the adherent layer comprises a plurality of grooves and wherein at least one of the grooves crosses another groove.

36. The method of claim 30 wherein the film further comprises a backing and an open structured sublayer attached to a major surface of the backing, and wherein the adherent layer comprises an airflow transmissive adherent layer attached to the sublayer.

37. The method of claim 30 wherein the adherent layer comprises adhesive microspheres.

38. The method of claim 30 wherein the adherent layer has at least one airflow pathway with a height in the range of about 15 microns to about 40 microns.

39. The method of claim 30 wherein the adherent layer has at least one airflow pathway with a width in the range of about 70 microns to about 250 microns.

40. The method of claim 30 wherein the adherent layer has at least one airflow pathway with a cross-sectional area in the range of about 1000 square microns to about 10,000 square microns.

41. The method of claim 30 wherein the act of placing the adherent layer in contact with the substrate includes the act of contacting the adherent layer to the substrate across an area that is approximately 40 percent to approximately 90 percent of the overall area of the film.

* * * * *

UNITED STATES PATENT AND TRADEMARK OFFICE
CERTIFICATE OF CORRECTION

PATENT NO. : 6,872,268 B2
DATED : March 29, 2005
INVENTOR(S) : David, John R.

It is certified that error appears in the above-identified patent and that said Letters Patent is hereby corrected as shown below:

Column 19,
Line 1, after Table 2, delete "with" and insert -- which --, therefor.

Column 23,
Line 66, delete "5°C" and insert -- 51°C --, therefor.

Signed and Sealed this

Thirty-first Day of May, 2005

JON W. DUDAS
*Director of the United States Patent and Trademark Office*